United States Patent
Guigné et al.

(10) Patent No.: US 8,400,874 B2
(45) Date of Patent: Mar. 19, 2013

(54) METHOD FOR COMBINED ACTIVE SOURCE AND PASSIVE SEISMIC IMAGING FOR SUBSURFACE FLUID MOVEMENT MAPPING AND FORMATION CHARACTERIZATION

(75) Inventors: Jacques Y. Guigné, Paradise (CA); Nicholas G. Pace, Bath (GB); Adam Gogacz, St. John's (CA)

(73) Assignee: Acoustic Zoom, Inc., Paradise, NL (CA)

( * ) Notice: Subject to any disclaimer, the term of this patent is extended or adjusted under 35 U.S.C. 154(b) by 389 days.

(21) Appl. No.: 12/826,078

(22) Filed: Jun. 29, 2010

(65) Prior Publication Data

US 2011/0317518 A1 Dec. 29, 2011

(51) Int. Cl.
*G01V 1/04* (2006.01)
*G01V 1/00* (2006.01)
(52) U.S. Cl. .................. 367/61; 166/250.01; 166/250.1; 73/152.02; 702/11; 702/12
(58) Field of Classification Search .................. 367/25, 367/35, 61; 166/250.1, 250.02, 252.5, 250.01; 73/152.02; 702/11, 12
See application file for complete search history.

(56) References Cited

U.S. PATENT DOCUMENTS

| | | | |
|---|---|---|---|
| 5,241,514 A * | 8/1993 | Ehlers | 367/61 |
| 7,383,133 B1 | 6/2008 | Scott | |
| 2005/0190649 A1 | 9/2005 | Eisner et al. | |
| 2009/0122645 A1 | 5/2009 | Guigne | |
| 2009/0242205 A1 * | 10/2009 | Coste et al. | 166/308.1 |
| 2010/0238765 A1 * | 9/2010 | Grechka et al. | 367/38 |
| 2010/0315902 A1 * | 12/2010 | Liang et al. | 367/40 |
| 2011/0044131 A1 | 2/2011 | Thornton et al. | |

OTHER PUBLICATIONS

International Search Report and Written Opinion, International Application PCT/CA2011/000738.

* cited by examiner

*Primary Examiner* — Ian Lobo
(74) *Attorney, Agent, or Firm* — Richard A. Fagin

(57) ABSTRACT

A method for characterizing fluid pumping effects on a subsurface formation includes (a) during pumping of fluid into the subsurface formation, detecting passive seismic signals related to fractures created in the subsurface formation. (b) A place of origin of the passive seismic signals is determined. (c) A seismic energy source is actuated for a plurality of actuations and an output thereof is beam steered toward the place of origin. (d) At least one acoustic property is determined for the place of origin using signals detected as a result of the plurality of actuations. The detected signals are beam steered toward the place of origin and are stacked over the plurality of actuations. (a), (b), (c) and (d) are repeated until the pumping is completed.

25 Claims, 5 Drawing Sheets

METHOD FOR COMBINED ACTIVE SOURCE AND PASSIVE SEISMIC IMAGING FOR SUBSURFACE FLUID MOVEMENT MAPPING AND FORMATION CHARACTERIZATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of active source acoustic characterization of subsurface rock formations and passive seismic emission mapping of subsurface microseismic events. More particularly, the invention relates to characterization and fluid distribution mapping with respect to time of subsurface rock formations having fluid pumped therein.

2. Background Art

Passive seismic emission tomography is a process in which an array of seismic sensors is deployed in a selected pattern on the Earth's surface (or on the water bottom in marine surveys) and seismic energy is detected at the sensors that emanates from various seismic events occurring within the Earth's subsurface. Processing the signals detected by the sensors is used to determine, among other things, the position in the Earth's subsurface and the time at which the various seismic events took place.

Applications for passive seismic emission tomography include, for example, determining the point of origin of microearthquakes caused by movement along geologic faults (breaks in rock layers or formations), movement of fluid in subsurface reservoirs, and monitoring of movement of proppant-filled fluid injected into subsurface reservoirs to increase the effective wellbore radius of wellbores drilled through hydrocarbon-producing subsurface Earth formations ("fracturing"). The latter application, known as "frac monitoring" is intended to enable the wellbore operator to determine, with respect to time, the direction and velocity at which the proppant filled fluid moves through particular subsurface Earth formations.

Passive seismic emission tomography for the above types of interpretation includes determining what are subsurface originating seismic events from within the signals detected at each of the seismic sensors, and for each event detected at the seismic sensors, determining the spatial position and time of the origin of the seismic event. Passive seismic interpretation methods known in the art are undergoing continuous improvement to better resolve the source of seismic events originating from the Earth's subsurface. One particularly useful technique for passive seismic monitoring is described in U.S. Pat. No. 7,663,970 issued to Duncan et al.

Active or controlled source seismic evaluation of subsurface rock formations includes a technique described in International Patent Application Publication No. WO 2009/062286, the application for which was filed by Guigné et al. and is commonly owned with the present invention. The evaluation technique described in the WO '286 publication includes directing seismic energy, by repetitive operation of a seismic source such as a vibrator or air gun array, preferably along a selected direction or to a selected point in the subsurface, and detecting seismic energy from the source after its interaction with the formations by using an array of seismic sensors deployed above the subsurface formations. The sensitivity of the array may be beam steered to a selected position within the subsurface. Repetitive actuation of the source and stacking of the detected energy combined with beam steering the array response may result in higher frequency seismic energy being detected from the subsurface than is otherwise obtainable using conventional common mid point (CMP) reflection seismic survey techniques. Such higher frequency content may enhance the resolution of the seismic information obtained from the detected signals.

It is desirable to evaluate how the petrophysical properties of fractured subsurface formations change as a result of hydraulic fracturing in order that fluid flow properties of wellbores drilled through a subsurface can be optimized.

SUMMARY OF THE INVENTION

A method according to one aspect of the invention for characterizing induced fractures in a subsurface formation includes (a) during pumping of fluid into the subsurface formation, detecting passive seismic signals related to movement of the fluid in the subsurface formation. (b) A place of origin of the passive seismic signals is determined. (c) A seismic energy source is actuated for a plurality of actuations and an output thereof is beam steered toward the place of origin. (d) At least one acoustic property is determined for the place of origin using signals detected as a result of the plurality of actuations, the detected signals are beam steered toward the place of origin and are stacked over the plurality of actuations. (a), (b), (c) and (d) are repeated until the pumping is completed.

A method according to another aspect of the invention for characterizing a subsurface formation includes (a) determining at least one acoustic property of the formation prior to pumping fluid into the formation. The determining the acoustic property includes determining images at a plurality of points in the formation obtained by repeatedly imparting seismic energy into the subsurface formation, detecting seismic energy using a plurality of seismic receivers disposed in a selected pattern above the subsurface formation, stacking signals from the receivers, and beam steering response of the receivers to each image point. (b) During pumping of fluid into the subsurface formation, passive seismic signals are detected and a place of origin of the passive seismic signals is determined. (c) The seismic energy source is actuated and output is beam steered toward the place of origin. (d) The determining the acoustic property for the place of origin is repeated. (e) Then (b), (c) and (d) are repeated until pumping is completed.

Other aspects and advantages of the invention will be apparent from the following description and the appended claims.

DETAILED DESCRIPTION

An objective of methods according to the present invention is to provide a localized examination of subsurface Earth structures with higher resolution (both laterally and vertically) than is typically possible using conventional seismic surveying, so that properties of fluid induced changes (e.g., gas-filled porosity or hydraulic fractures) in subsurface rock formations may be more accurately characterized with acoustic energy. In some examples, the localized examination may be repeated at selected times to determine changes in spatial distribution rock properties in subsurface rock formations as a result of such fluid pumping. Various examples of methods according to the invention may provide such enhanced resolution examinations at depths of 1.0 km to 3.5 km below the Earth's surface, or in marine environments within a similar range of distances below the water bottom. The particular volume within the Earth's subsurface to be evaluated may be selected from prior, conventional seismic surveys, for example. In methods according to the invention, relatively high frequency (as contrasted with conventional seismic) seismic energy is used, and coherent stacking from multiple actuations of a seismic energy source is used to mitigate the attenuation of such higher frequency energy which occurs as a result of the acoustic properties of the subsurface rock formations. The spatial (e.g., vertical) resolution of a seismic survey made according to various examples of the invention can thus be better than that obtainable from conventional seismic surveys.

The lateral resolution of surveys made according to the invention depends, as is the case for conventional seismic surveys, on the aperture size of an array of seismic sensor used to detect seismic energy above the volume to be investigated. Data processing according to the invention, however, is relatively fast as contrasted with conventional seismic data processing because it is based on the steering of focused beams, rather than on depth or time migration analysis. Methods according to the invention thus can provide the ability to monitor subsurface reservoirs during fluid pumping operations using time-lapse imaging, allowing a better understanding of the movement of fluids in such subsurface reservoirs.

Figure 1:
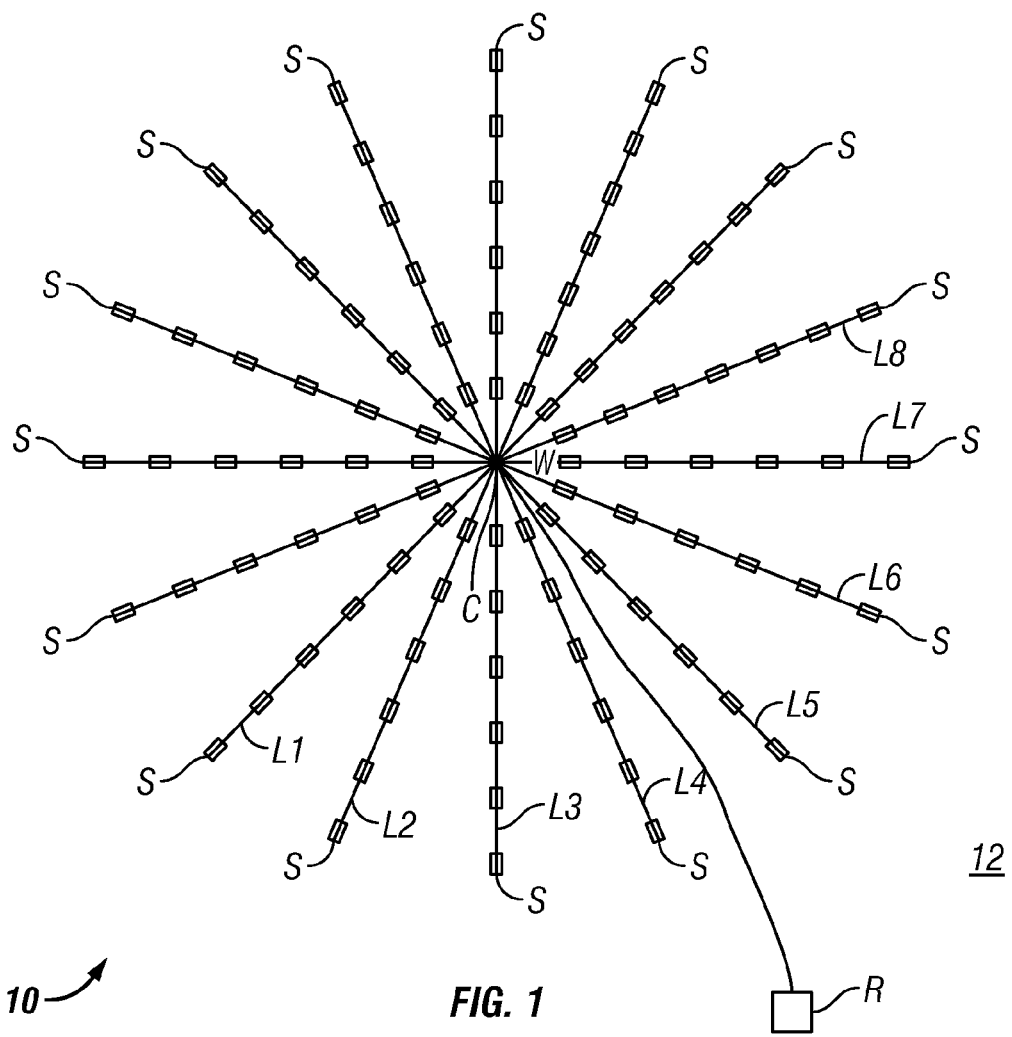
FIG. 1 shows an example of a sensor array used for subsurface imaging according to the invention.

An example seismic sensor array that may be used in accordance with the invention is shown schematically at 10 in FIG. 1. In the example shown in FIG. 1, the seismic sensor array 10 may be disposed on or near the land surface or on the bottom of a body of water such as a lake or the ocean in marine surveys, both such surfaces represented by numeral 12. The seismic sensor array 10 may include individual seismic sensor cables L1 through L8. The cables L1 through L8 may each include a plurality of spaced apart seismic sensor modules S disposed along the length of each seismic sensor cable L1-L8. Each of the seismic sensor modules S may include a so-called "four-component" seismic sensor (not shown separately). "Four-component" seismic sensors typically include three, orthogonally oriented particle motion responsive sensors such as geophones or accelerometers, and a substantially collocated pressure or pressure time gradient responsive sensor such as a hydrophone. See, for example, U.S. Pat. No. 5,774,417 issued to Corrigan et al. for an example of such four component seismic sensors used in a sensor cable for deployment on the bottom of a body of water. Examples of the longitudinal spacing between sensor modules and the number of the sensor modules S on each seismic sensor cable L1-L8 will be further explained below. Each seismic sensor (not shown separately) in each sensor module S may generate electrical and/or optical signals related to the parameter being measured (e.g., velocity, acceleration, pressure or pressure time gradient). The sensor signals may be communicated, according to the type of sensor output signal, to a recording unit R. The recording unit R may be disposed on the water bottom, or in a buoy near the water surface for signal record storage and later retrieval, or may be deployed on the lad surface in such surveys.

A seismic energy source W, which may be an air gun array or water gun array, or other suitable sources, such as magnetostrictive or piezoelectric transducers, seismic vibrators and the like, may be disposed proximate the center C of the sensor array 10. The source W is actuated at selected times, and a time indexed record of the signals produced by each sensor in each module S can be recorded in the recording unit R for later analysis. Particular characteristics of the seismic energy source W will be further explained below.

The seismic sensor cables L1-L8 may be arranged in a radial pattern as shown in FIG. 1. The seismic sensor cables L1-L8 in the present example may be symmetrically arranged about the center point C of the array 10 and angularly displaced from each other by an angle of about 22½ degrees (wherein there are 16 radial arms of sensor lines substantially equally angularly spaced). In other examples, fewer or more cables may be used than is shown in FIG. 1. It is contemplated that in such other examples the angular displacement or spacing between each of the cables will be approximately equal, however equal angular displacement between sensor cables is not a limit on the scope of the present invention. The radial sensor cable arrangement shown in FIG. 1 may be advantageous in calculating phase delays for beam steering of the sensor response. However, other geometric arrangements may be used, including randomly spaced arrangements, which can also be beam steered according to the invention.

Figure 1A:
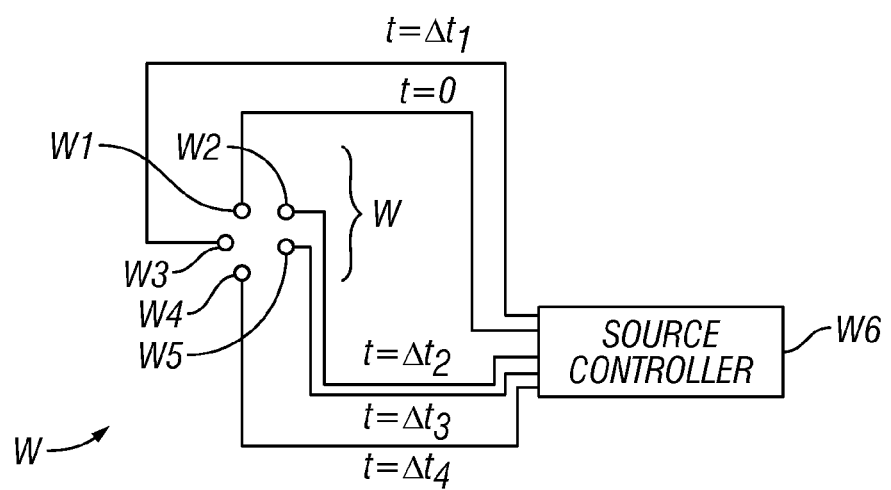
FIG. 1A shows a seismic energy source array that may be used with the array shown in FIG. 1.

FIG. 1A shows one example of the seismic energy source W in more detail. The source W may consist of a plurality of individual air guns or water guns or other suitable seismic energy sources such as explained above, shown at W1 through W5 arranged in a small-diameter, generally circular pattern. The individual sources W1-W5 may be actuated by a source controller W6, which may be in operative communication with the recording unit (R in FIG. 1) so that the signal recordings may be time indexed to the actuation time of the source W. In the present example, the source controller W6 may be configured to successively, individually (or in subsets or subcombinations) actuate each source W1-W5 at a selected time delay (which may be zero or any other selected time delay) after the actuation of the first one of the sources W1-W5. The time delay may be selected such that the energy output of the array of sources W1-W5 is oriented substantially along a selected direction (i.e., beam steered). In such examples, the directivity of the source W may be used to further illuminate subsurface features identified during signal processing or otherwise. Such specific illumination will be further explained below with reference to FIG. 3.

Figure 1B:
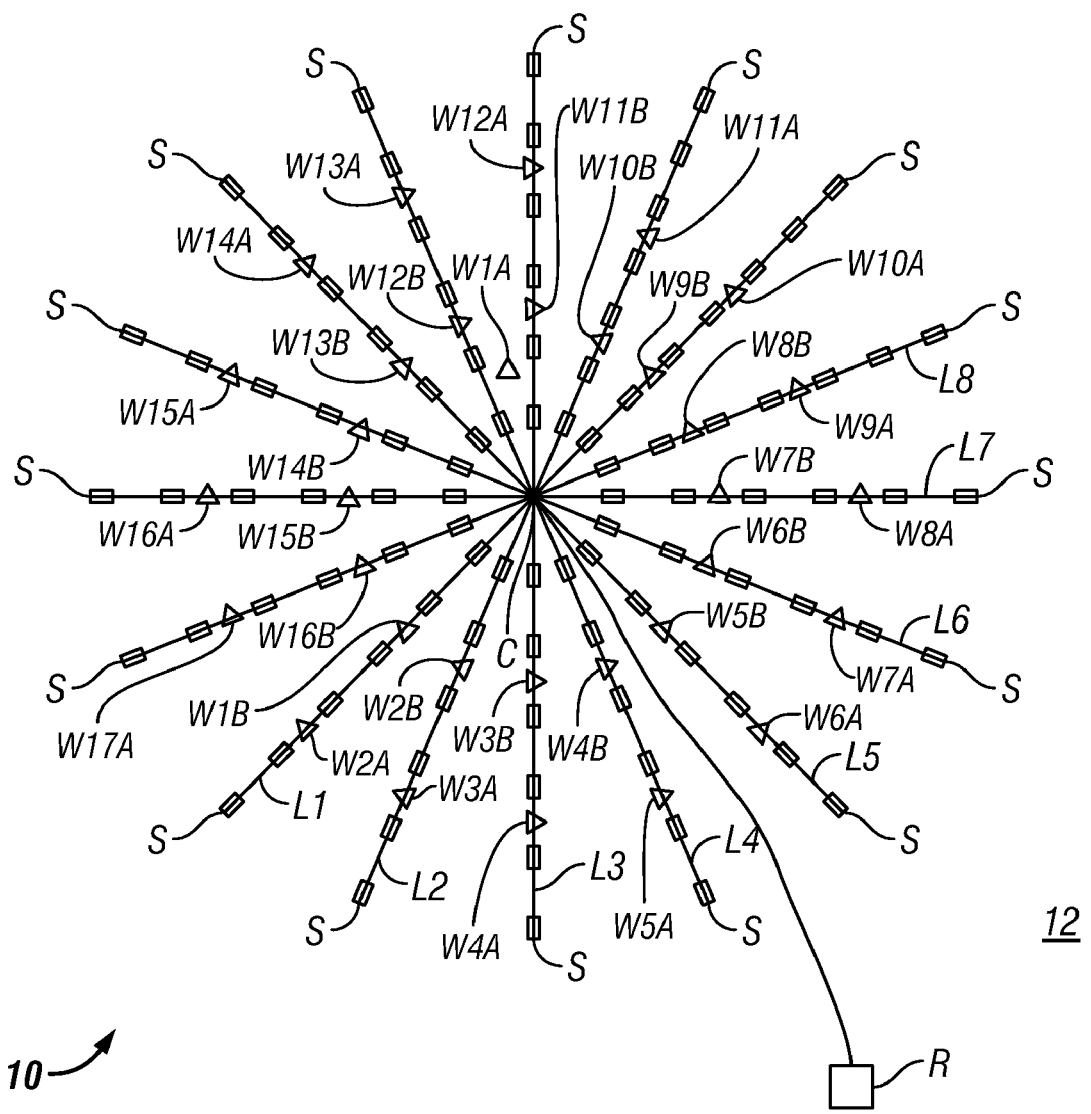
FIG. 1B shows a plurality of seismic energy sources that may be used in some examples for directed subsurface illumination.

Another possible implementation having even greater source focusing capability than the example shown in FIG. 1A is shown in FIG. 1B. The example shown in FIG. 1B includes a first seismic energy source disposed at a first selected position being a selected radial distance from the center of the array 10. The example shown in FIG. 1B has such first positions being along each of the seismic sensor cables L1-L8. Such seismic energy sources are shown at W2B through W17B, inclusively. A second seismic energy source may be placed at a second selected position being a second radial distance from the center of the array 10. The example of FIG. 1B has these positions being along each of the sensor cables L1-L8. Such second sources are shown correspondingly at W2A through W17A inclusive. A further seismic energy source W1A may also be disposed proximate the center of the array 10. The seismic energy sources W1A through W17A and W2B through W17B may be controlled by a seismic source controller similar in function to the device described above with reference to FIG. 1A at W6. In the example shown in FIG. 1B, the seismic energy sources may be actuated in combination with suitable time or phase delays to form a steerable beam array having an aperture of about two wavelengths of the seismic energy emitted by the sources. The actuation time of the individual sources W1A through W17B may be selected to result in a seismic energy beam directed toward a selected subsurface location. Actuation of the sources with selected delay timing or phase delay as above may be repeated with different time delays or phase delays for each individual source to selectively illuminate different positions in the subsurface.

It has been determined through response simulation that using the additional seismic sources W2A through W17B as explained above provides good beam steering response when each first source position is about one wavelength of the seismic energy from the center of the array 10, and each second source position is about two wavelengths from the center of the array 10. The arrangement shown in FIG. 1B includes having the first and second source positions along each sensor cable L1-L8, however, the sources do not need to be so located. The seismic energy sources can be located at any circumferential position with respect to the sensor cables.

A longitudinal spacing between seismic sensor modules (S in FIG. 1) on each sensor cable, and a number of such seismic sensor modules on each cable may be determined by the frequency range over which a seismic analysis of the subsurface rock formations is to be performed. Such seismic frequencies, of course, must have been radiated by the seismic energy source. Selection of suitable frequency for the seismic energy source will be explained in more detail below. The longitudinal spacing between seismic sensor modules forming the receiver array is preferably selected such that for a particular seismic frequency the spacing should not be greater than about one-half the seismic energy wavelength. At each frequency an example cable length may be about 80 to 120 wavelengths of the longest wavelength seismic energy frequency. Thus, it is possible to use an array having sensor cables of overall length 120 wavelengths at the lowest frequency, but variable longitudinal spacing along each cable between the seismic sensor modules, so that the overall array will include 120 wavelength-long sensor arrays at higher frequencies with a half-wavelength spacing at such higher frequencies. The sound speed (seismic velocity) used to determine the wavelength is that within the rock formations near the water bottom (or the Earth's surface in land based surveys).

In some examples, the seismic sensor modules S may be arranged in sub-groups having spacing therebetween less than about one-half the expected wavelength of seismic energy from the Earth's subsurface that is intended to be detected. Signals from all the sensors in one or more of the sub-groups may be added or summed to reduce the effects of noise in the detected signals.

In other examples, one or more of the seismic sensor modules S may be placed in a wellbore, either permanently for certain long-term monitoring applications, or temporarily, such as by wireline conveyance, tubing conveyance or any other sensor conveyance technique known in the art.

Figure 2:
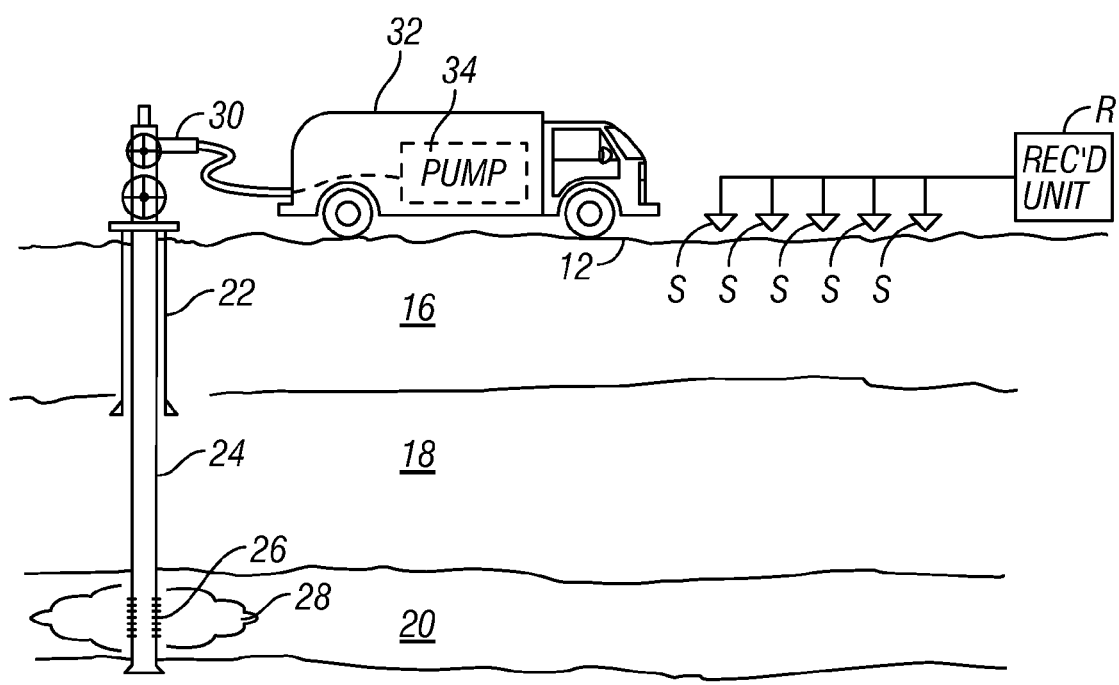
FIG. 2 shows an example arrangement for hydraulic fracturing.

As stated previously, the present invention relates to characterizing subsurface rock formations that have undergone or will undergo pumping of fluid therein. Referring to FIG. 2, a wellbore 22 is shown drilled through various subsurface rock formations 16, 18, ultimately penetrating through a reservoir formation 20. A wellbore casing or tubing 24 having perforations 26 formed therein corresponding to the depth of the reservoir formation 20 is connected to a valve set known as a wellhead 30 disposed at the Earth's surface. The wellhead may be hydraulically connected to a pump 34 in a fluid pumping unit 32. The fluid pumping unit 32 is used in the process of pumping a fluid, which in some instances includes selected size solid particles, collectively called "proppant", are disposed. Pumping such fluid, whether propped or otherwise, may be part of the process of hydraulic fracturing. Pumping fluid may also include, without limitation, injection of gas such as nitrogen or carbon dioxide, or hydrocarbon gas such as methane for subsurface storage in the reservoir formation. The movement of the fluid is shown schematically at the fluid front 28 in FIG. 2.

In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." In propped fracturing operations, the particles of the proppant move into such fissures and remain therein after the fluid pressure is reduced below the fracture pressure of the formation 20. The proppant, by appropriate selection of particle size distribution and shape, forms a high permeability channel (not shown) in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

In other types of fluid pumping, movement of the fluid front 28 during pumping may create seismic energy that is detectable at the surface or water bottom by the array of sensors. Thus, irrespective of the type of fluid pumped, the pumping of fluid into the formation 20 by the fluid pressure may create seismic energy that can be detected by the seismic sensors (in the modules S in FIG. 1, 1B). The time at which the seismic energy is detected by each of the sensors with respect to the time-dependent position in the subsurface of the seismic energy caused at the fluid front 28 is related to the acoustic velocity of each of the formations 16, 18, 20, and the position of each of the seismic sensors S.

In the present example, during fluid pumping operations, seismic signals can be substantially continuously recorded (e.g., by recording unit R in FIG. 1). During selected time intervals within the pumping operation, the seismic energy source(s) (FIGS. 1A and 1B) may be actuated, typically for a plurality of actuations. During other time intervals within the pumping procedure the seismic energy sources may be switched off. During the latter time intervals when the seismic energy sources are off, passive seismic signals detected by the sensors may be used to determine time of origin and position (place) of origin of microseismic events in the subsurface, e.g., at the fluid front 28 as the fluid pumping operation progresses. Having located subsurface origin places of microseismic events, in subsequent source activation time intervals within the fluid pumping operation, seismic energy from the source (e.g., W1 through W6 in FIG. 1A and W1A-W16A and W2B through W17B in FIG. 1B) may be beam steered toward the determined origin place of the microseismic events in the subsurface. Recording of the detected seismic signals then may continue. After a selected interval of time, the source(s) are again switched off and passive seismic detection may resume by continued recording of the seismic sensor signals. The place of origin of microseismic events, e.g., the fluid front 28 may again be determined, new beam steering parameters for the seismic source may be determined, and the seismic sources may be actuated again for a selected time interval while signal recording continues. As explained above, each actuation of the seismic sources is expected to include a plurality of actuations. During signal processing, explained below, the detected signals from each of such actuations will be summed or stacked to increase signal to noise ratio and to increase the high frequency content of the processed seismic signals so that resolution may be enhanced.

One example of a method for determining place and time of origin of the seismic events occurring in the subsurface is described in U.S. Pat. No. 7,663,970 issued to Duncan et al. The foregoing technique is only one example of techniques to determine origin time and spatial position of microseismic events, however, and is not to be construed as a limitation on the scope of the present invention.

Another example method for determining place of origin of the microseismic events may be based on multilateration, in which the time difference of arrival (TDOA) of a seismic event between a reference sensor and several other sensors is used to determine the Cartesian (or other coordinate system) coordinates of the seismic source. Since the time difference of arrival is determinable for the same seismic event between a number of receivers, all but one of which are in the same plane, if one sensor, for example, is placed in a reference wellbore it is possible to calculate the positional coordinates of the seismic events. The one out of plane sensor could be in a hole or wellbore at a depth sufficient to measure the time difference of arrival between it and the in-plane sensors. The in-plane sensors are configured such that they are well separated, and the actual time difference of arrival can be accurately measured for each seismic event. The interrogation receivers of the array (10 in FIG. 1) can be radially spaced at half wavelength typically along eight arms as shown in FIG. 1 or even in a randomized configuration. Signals from all the receivers may be used together for beamforming/steering. All the receivers can be used for multilateration but not simultaneously. For example, one may select a subset of the receivers, e.g., 10 receivers, which are sufficiently far apart that it is possible to measure the time delay between the arrivals of an event on each of the selected receivers. The receivers should be spaced closely enough that the same seismic event remains correlated in the signals in each receiver. Then a large number of such 10 receiver subsets can be identified and similarly used. Each subset would include the out of plane receiver described above.

In determining place of origin of microseismic events, the time of origin is ordinarily determined. In a method for characterizing rock formations according to the invention, the time of origin need not be used other than determining the place of origin as explained above.

Figure 3:
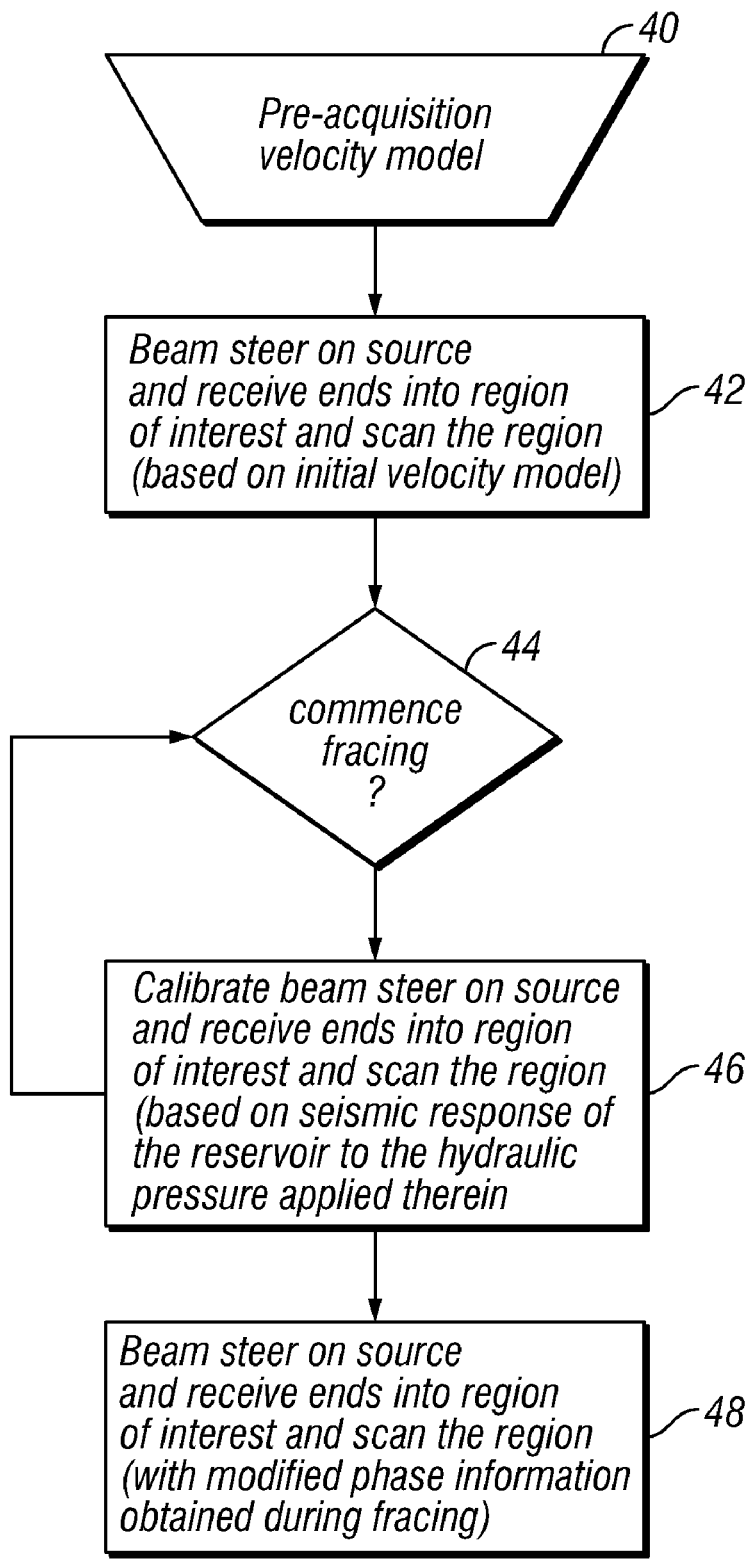
FIG. 3 shows a flow chart of an example acquisition procedure.

Referring to FIG. 3, an example data acquisition procedure according to the invention will be explained. At 40, a pre-acquisition velocity model of the area or volume of the subsurface to be evaluated may be obtained, for example, by surface reflection seismic surveys. Such surface seismic surveys may be combined, for example with acoustic velocity logs, if available, made in wellbores drilled through the subsurface formations of interest. At 42, the seismic energy source(s) (see FIG. 1A) are actuated, and the outputs thereof are beam steered to one end of or to any other selected position in the volume of interest. Typically, but not necessarily the volume of interest will be in the reservoir formation. Similarly, during processing of recorded signals from such acquisition, the sensor array (10 in FIG. 1) response is beam steered to the same point as the source array. While fluid pumping begins the phase delays for the source array and for the receiver array may be updated, pseudo real time, based on earth response (energy radiation) to the fluid pumping. The phase delays are conducted to the source controller to further increase the focusing of both the source and receiver arrays. The estimation of focusing is based on maximization of intensity of the radiated energy for both compressional (P) and shear (S) energy arrivals from the focal point of the steered beams. At all times, phase delays for each source and receiver may be stored in a database for future reference. The foregoing may be repeated for every point of interest in the subsurface region being evaluated, and ultimately affected by fluid pumping into the reservoir formation. Evaluation uses the initial velocity model from 40 to select initial time delays for the beam steering.

After the initial response to the focused source and receiver response is performed, at 44 fluid pumping (FIG. 2) is initiated. At 46, during time intervals described above when the seismic source is not actuated, passive seismic signals are detected and the places of origin of seismic events in the subsurface are determined from the passive seismic signals. The beam steering for the source and the receivers is then directed to the located places of origin. The foregoing is repeated during the entire fluid pumping procedure such that during active seismic acquisition, an effective scan of the subsurface region of interest is performed based on seismic response of the fluid-affected formation to the fluid injected therein. At 48, beam steering is performed on both the seismic energy source and the receivers through the region of interest and the region may be scanned with modified phase information obtained during the fluid pumping process.

Figure 4:
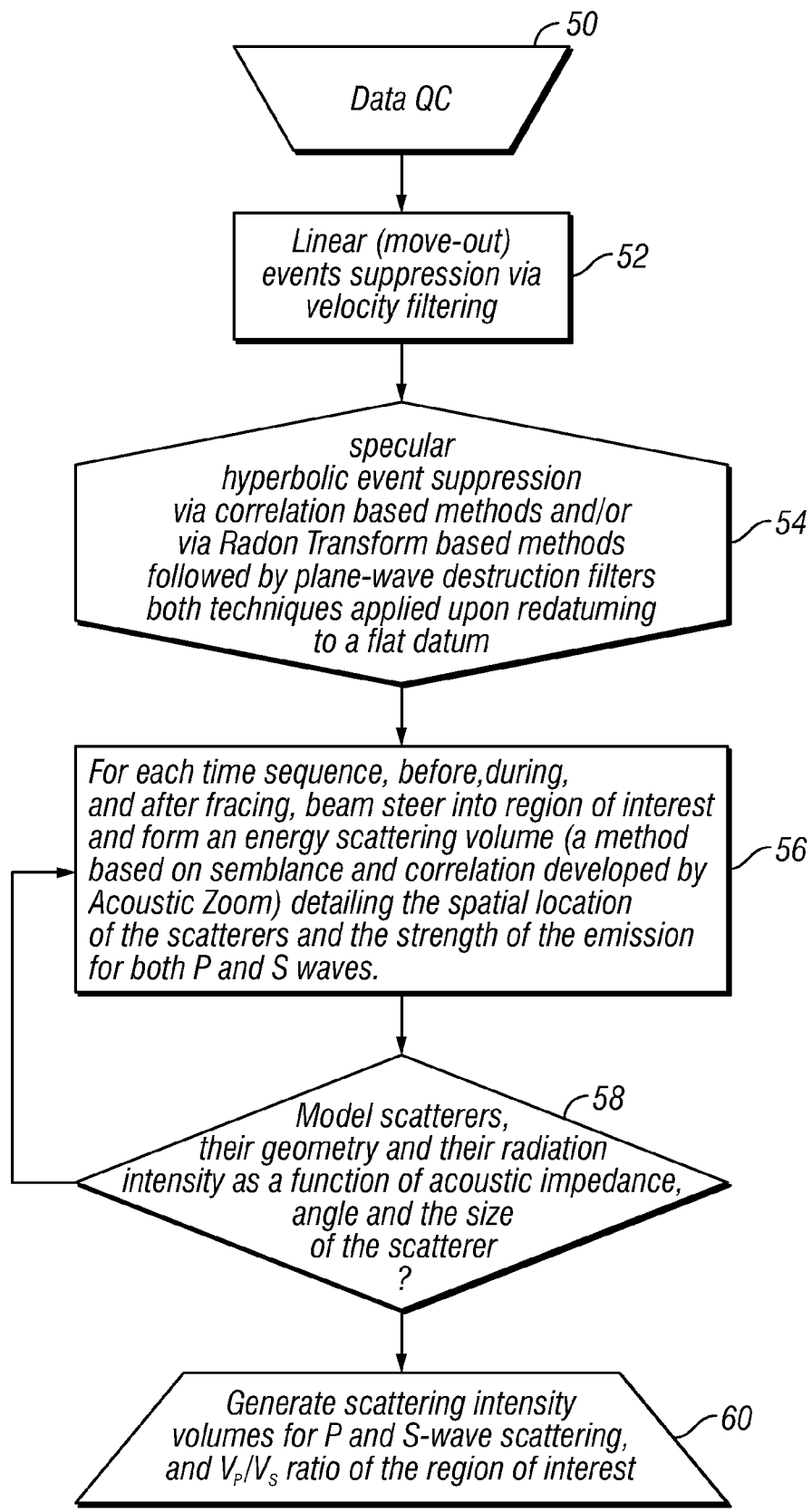
FIG. 4 shows a flow chart of an example post-acquisition data processing procedure.

After the data are acquired, until the end of the fluid pumping (FIG. 2), post processing of the data to evaluate changes in the subsurface formation (e.g., in at least one acoustic property of the rock formation) caused by the fluid pumping may include the following with reference to FIG. 4. At 50, the data are quality checked; this includes, but is not limited to frequency filtering, dead trace kill, etc. At 52, linear events in the data may be suppressed by velocity filtering, for example, f, k (frequency-wavenumber) filtering. Such linear events may include, for example, ground roll, direct and refracted wave phenomena are all linear events on the shot-gather and these are readily suppressed via polygonal reject/pass filters in the f, k domain. At 54, specular hyperbolic event suppression may be performed using, for example, correlation based methods and/or Radon transform based methods, followed by plane-wave destruction filtering. Both techniques may be applied upon redatuming the processed signals to a planar datum. The correlation based method relies on windowed trace-to-trace correlation of specular events and subsequent suppression with strength proportional to the local correlation, a method akin to predictive deconvolution. The plane-wave destruction filtering is a method that is applied to Radon transformed constant p gathers; each split-spread gather (8 arms=8 split spread gathers) is Radon transformed (see, Yilmaz and Taner, Geophysics, Vol. 59, No. 6, 1994), data is sorted into constant p-sections and subsequently plane-wave destruction filter is applied (this part of specular event suppression coincides with work described in, Taner, Fomel, and Landa, *Separation of imaging of seismic diffractions using plane-wave decomposition*, SEG/New Orleans 2006 Annual Meeting).

At 56, for each time sequence, before, during, and after fluid pumping, beam steer the receiver array into a selected region of interest and form an energy scattering volume detailing the spatial location of acoustic energy scatterers and the strength of the emission for both compressional (P) and shear (S) waves. Then, at 58, the acoustic scatterers, may be modeled with respect to their geometry and their radiation intensity as a function of acoustic impedance, angle and the size of each scatterer. The modeling of the scatterers is aided by referencing the optimal phase delays, retrieved from the database. The database was established during fracturing, as detailed above. That is, by analyzing the hyperbolic events associated with the scattering/diffractions and by analyzing the amplitude decay, the scatterers/diffractors may be modeled while at the same time, phase delay information can be used to update the velocity model. This is an iterative process that terminates when a sufficiently focused image is obtained. At 60, scattering intensity volumes for P and S-wave scattering, and Vp/Vs (compressional velocity to shear velocity) ratios are generated for each scatterer in the region of interest as a function of time (before, during and after fluid pumping). This time series establishes a four dimensional volume detailing the evolution of the fluid pumping process, its spatial extent and the Vp/Vs ratios changes therein with respect to time. Changes to the reservoir that may be mapped with respect to time using a method according to the invention may include, without limitation, permeability (inferred from the volume of proppant filled rock formation in the case of fracturing), and gas filled porosity in the case of injection of any type or composition of gas into the reservoir. Gas filled porosity, for example will substantially affect the compressional and shear velocities of the rock formation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for characterizing fluid pumping effects on at least one acoustic property of a subsurface formation, comprising:
    (a) determining at least one acoustic property of the subsurface formation prior to fluid pumping, the determining at least one acoustic property comprising determining images at a plurality of points in the subsurface formation obtained by repeatedly imparting seismic energy into the subsurface formation, detecting seismic energy using a plurality of seismic receivers disposed in a selected pattern above the subsurface formation, stacking signals from the receivers generated in response to the detected seismic energy, and beam steering the response of the plurality of receivers to each of the image points;
    (b) during pumping of fluid into the subsurface formation, detecting passive seismic signals related to fluid movement in the subsurface formation;
    (c) determining a place of origin of the passive seismic signals;
    (d) actuating the seismic energy source and beam steering an output thereof toward the determined place of origin;
    (e) repeating the determining the at least one acoustic property for the place of origin;
    (f) repeating (b), (c), (d) and (e) until the pumping is completed; and
    (g) determining a change in the at least one acoustic property at each determined place of origin between prior to pumping and after pumping is completed.

2. The method of claim 1 wherein the places of origin are determined by time difference of arrival.

3. The method of claim 2 wherein at least one receiver is disposed outside of a plane containing the plurality of receivers.

4. The method of claim 1 wherein the receivers are disposed in a plurality of radially extending arms centered on a surface location of a subsurface wellbore.

5. The method of claim 1 wherein the seismic source comprises a plurality of transducers coupled to a controller such that a collective output of the transducers is steerable.

6. The method of claim 1 further comprising filtering linear events from the signals detected by the receivers.

7. The method of claim 1 further comprising filtering specular reflection event energy from the detected seismic signals.

8. The method of claim 1 wherein the at least one acoustic property comprises a radiation intensity of at least one scattering feature in the subsurface formation.

9. The method of claim 1 wherein the at least one acoustic property comprises compressional velocity to shear velocity ratio.

10. The method of claim 1 wherein the at least one acoustic property comprises at least one of compressional and shear velocity.

11. The method of claim 1 wherein the fluid comprises hydraulic fracturing fluid.

12. The method of claim 1 wherein the fluid comprises gas.

13. A method for characterizing changes in at least one acoustic property of a subsurface formation resulting from pumping fluid therein, comprising:
    (a) during pumping of fluid into the subsurface formation, detecting passive seismic signals related to fractures created in the subsurface formation;
    (b) determining a place of origin of the passive seismic signals;
    (c) actuating a seismic energy source for a plurality of actuations and beam steering an output thereof toward the place of origin;
    (d) determining at least one acoustic property for the place of origin using signals detected as a result of the plurality of actuations, the detected signals beam steered toward the place of origin and stacked by summing the detected, beam steering signals from each of the plurality of actuations;
    (e) repeating (a), (b), (c) and (d) until the pumping is completed.

14. The method of claim 13 further comprising:
    prior to pumping the fluid, determining the at least one acoustic property of the subsurface formation at a plurality of image points in the subsurface formation obtained by repeatedly imparting seismic energy into the subsurface formation, detecting seismic energy using a plurality of seismic receivers disposed in a selected pattern above the subsurface formation, stacking signals from the receivers generated in response to the detected seismic energy, and beam steering response of the plurality of receivers to each of the image points.

15. The method of claim 13 wherein the places of origin are determined by time difference of arrival.

16. The method of claim 15 wherein at least one receiver is disposed outside of a plane containing the plurality of receivers.

17. The method of claim 13 wherein the receivers are disposed in a plurality of radially extending arms centered on a surface location of a subsurface wellbore.

18. The method of claim 13 wherein the seismic source comprises a plurality of transducers coupled to a controller such that a collective output of the transducers is steerable.

19. The method of claim 13 further comprising filtering linear events from the signals detected by the receivers.

20. The method of claim 13 further comprising filtering specular reflection event energy from the detected seismic signals.

21. The method of claim 13 wherein the at least one acoustic property comprises a radiation intensity of at least one scattering feature in the subsurface formation.

22. The method of claim 13 wherein the at least one acoustic property comprises compressional velocity to shear velocity ratio.

23. The method of claim 13 wherein the at least one acoustic property comprises at least one of compressional and shear velocity.

24. The method of claim 13 wherein the fluid comprises hydraulic fracturing fluid.

25. The method of claim 13 wherein the fluid comprises gas.

* * * * *